US008817731B2

United States Patent
Kondo

(10) Patent No.: US 8,817,731 B2
(45) Date of Patent: Aug. 26, 2014

(54) MOBILE STATION APPARATUS, BASE STATION APPARATUS, RADIO COMMUNICATION SYSTEM, CONTROL METHOD FOR MOBILE STATION, AND CONTROL METHOD FOR BASE STATION

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 85 days.

(21) Appl. No.: 13/574,973

(22) PCT Filed: Dec. 15, 2010

(86) PCT No.: PCT/JP2010/007284
§ 371 (c)(1),
(2), (4) Date: Jul. 24, 2012

(87) PCT Pub. No.: WO2011/089674
PCT Pub. Date: Jul. 28, 2011

(65) Prior Publication Data
US 2012/0300749 A1 Nov. 29, 2012

(30) Foreign Application Priority Data

Jan. 25, 2010 (JP) ................................. 2010-013008
Apr. 9, 2010 (JP) ................................. 2010-090122

(51) Int. Cl.
*H04Q 7/00* (2006.01)
(52) U.S. Cl.
USPC ............ 370/329; 370/328; 370/431; 370/341
(58) Field of Classification Search
None
See application file for complete search history.

(56) References Cited

U.S. PATENT DOCUMENTS

2009/0161619 A1* 6/2009 Noma ........................... 370/329
2009/0227261 A1* 9/2009 Tiirola et al. ................. 455/450
2010/0254344 A1* 10/2010 Wei et al. ...................... 370/330
2010/0279703 A1 11/2010 Morita et al.
2010/0311452 A1* 12/2010 Li et al. ......................... 455/509
2011/0222525 A1* 9/2011 Kishigami et al. ............ 370/343

FOREIGN PATENT DOCUMENTS

| KR | 10-2005-0109970 A | 11/2005 |
|---|---|---|
| WO | 2009/029009 A1 | 3/2009 |
| WO | 2009/043002 A2 | 4/2009 |
| WO | 2009/072355 A1 | 6/2009 |

OTHER PUBLICATIONS

Office Action dated Sep. 24, 2013, issued by the Korean Intellectual Property Office in counterpart Korean Application No. 10-2012-7019656.
3GPP TS 36.423 V9.1.0 (Dec. 2009), "Evolved Universal Terrestrial Radio Access Network (E-UTRAN); X2 application protocol (X2AP) (Release 9)", Section 8.3.1 "Load Indication," pp. 1-114.

* cited by examiner

*Primary Examiner* — Duc C Ho
(74) *Attorney, Agent, or Firm* — Sughrue Mion, PLLC

(57) ABSTRACT

A mobile station apparatus includes a radio communication unit and a radio resource request unit. The radio communication unit is configured to be able to perform radio communication with a first base station and a second base station. The radio resource request unit requests the second base station to temporarily allocate a radio resource of at least one of an uplink and a downlink when the radio communication unit performs transmission of an uplink signal and reception of a downlink signal with the first base station. Further, the radio resource request unit makes the radio resource allocated by the second base station available for transmission of the uplink signal or reception of the downlink signal with the first base station performed by the radio communication unit.

17 Claims, 12 Drawing Sheets

MOBILE STATION APPARATUS, BASE STATION APPARATUS, RADIO COMMUNICATION SYSTEM, CONTROL METHOD FOR MOBILE STATION, AND CONTROL METHOD FOR BASE STATION

CROSS REFERENCE TO RELATED APPLICATIONS

This application is a National Stage of International Application No. PCT/JP2010/007284 filed Dec. 15, 2010, claiming priority based on Japanese Patent Application Nos. 2010-013008 filed Jan. 25, 2010 and 2010-090122 filed Apr. 9, 2010, the contents of all of which are incorporated herein by reference in their entirety.

TECHNICAL FIELD

The present invention relates to a technique to dynamically suppress inter-cell interference that is caused by an overlap between radio resources used in neighboring cells.

BACKGROUND ART

In 3GPP (3rd Generation Partnership Project), 3GPP2 (3rd Generation Partnership Project 2), WiMAX (Worldwide Interoperability for Microwave Access) forum, and the like, the standardization of compact base stations that can be installed in user's houses, offices, and the likes has been pursued. It has been assumed that these compact base stations are installed in houses, small-scale offices, and the like by the user who owns the compact base station and are connected to a core NW by using a broadband line such as an ADSL (Asymmetric Digital Subscriber Line) and a fiber-optic line. These compact base stations are usually called "femto base stations", "femtocell base stations", or "home base stations". Further, the size of a cell formed by a compact base station, i.e. cover area, is extremely smaller than that of the conventional macrocell. Therefore, a cell formed by a compact base station is called "femtocell", "home cell", or the like. In 3GPP, the standardization task has been under way while defining these compact base stations as "Home NodeB (HNB)" and "Home eNodeB (HeNB)". The HNB is a compact base station for UTRAN (UMTS (Universal Mobile Telecommunications System) Terrestrial Radio Access Network) and the HeNB is a compact base station for LTE (Long Term Evolution)/EUTRAN (Evolved UTRAN).

In this specification, these compact base stations are called "femtocell base stations". Note that a femtocell base station for UTRAN or E-UTRAN, which has been examined in 3GPP, is called HNB or HeNB, or called collectively as "H(e)NB", following the example in 3GPP.

Further, in LTE and WiMAX, OFDMA (Orthogonal Frequency Division Multiple Access) has been adopted as a multiple access method. In the case of LTE, the OFDMA is used for both the uplink and the downlink. Note that the uplink access method in the LTE is called "SC-FDMA (Single Carrier Frequency Division Multiple Access)" or "DFTS-OFDM (Discrete Fourier Transform Spread OFDM)". In the SC-FDMA, different OFDM subcarriers are used to transmit uplink signals of different users (UEs: User Equipments). That is, even in the SC-FDMA, the uplink signal of each user is multiplexed by the OFDMA.

In the LTE, allocation of radio resources for the uplink and the downlink is carried out by using resource blocks (RBs) as base units. Each RB includes a plurality of OFDM subcarriers in a frequency domain and includes at least one symbol period in a time domain. In the LTE, each RB is defined by 180 kHz bandwidth and 0.5 ms time for both the uplink and the downlink. Further, the RB in the LTE includes twelve OFDM subcarriers and seven OFDM symbols. The allocation of RBs for a UE is carried out in units of 2 RB time (1 ms) by a resource block scheduling function equipped in eNB.

When two neighboring eNBs use the same RB, there is a possibility that inter-cell interference occurs. To dynamically suppress the inter-cell interference caused by the overlap of the used RBs, an eNB performs signaling with a neighbor eNB and performs RB scheduling so that the inter-cell interference is avoided. For example, Non-patent literature 1 discloses a technique to dynamically suppress inter-cell interference caused by the overlap of uplink RBs. Specifically, an eNB receives "LOAD INFORMATION" from a neighbor eNB by using inter-eNB interface (X2 interface). As one of information elements (IEs) included in the "LOAD INFORMATION", "UL High Interference Indication IE" is defined. The "UL High Interference Indication IE" indicates an RB for which large interference is occurring in the neighbor eNB as a transmission-source of the "LOAD INFORMATION. When the "LOAD INFORMATION" is received, the eNB attempts not to allocate the RB specified by the "UL High Interference Indication IE" to any UE located near the cell edge. In this way, it is possible to dynamically suppress the interference to the UL signal of the neighbor cell that would otherwise occur when the UE located near the cell edge uses that RB.

CITATION LIST

Non-Patent Literature

Non-patent literature 1: 3GPP TS 36.423 V9.1.0 (2009-12), "Evolved Universal Terrestrial Radio Access Network (E-UTRAN); X2 application protocol (X2AP) (Release 9)", Section 8.3.1 "Load Indication".

SUMMARY OF INVENTION

Technical Problem

As described above, an ordinary macrocell base station (e.g., eNB) has an interface with a neighbor base station and thus can dynamically suppress inter-cell interference caused by the overlap of RBs by performing inter-base-station signaling. However, a femtocell base station such as an HeNB may not have the inter-base-station interface that is used to perform signaling with a neighbor base station including a macrocell base station. Further, since it is conceivable that a lot of femtocell base stations are located within a macrocell, it is very difficult, in reality, to construct inter-base-station interfaces among all neighboring base stations.

The present invention has been made based on the above-described knowledge of the inventor of the present application, and an object thereof is to provide a mobile station apparatus, a base station apparatus, a radio communication system, a control method, and a program, capable of contributing to dynamic suppression of interference between neighboring cells that is caused by the collision of radio resources without relying on signaling performed between neighboring base stations.

Solution to Problem

A first aspect of the present invention includes a mobile station apparatus. The mobile station apparatus includes a radio communication unit and a radio resource request unit. The radio communication unit is configured to perform radio communication with first and second base stations. When the radio communication unit performs transmission of an uplink signal and reception of a downlink signal with the first base station, the radio resource request unit requests the second base station to temporarily allocate a radio resource of at least one of an uplink and a downlink. Further, the radio resource request unit makes the radio resource allocated by the second base station available for transmission of the uplink signal or reception of the downlink signal with the first base station performed by the radio communication unit.

A second aspect of the present invention includes a base station apparatus. The base station apparatus includes a radio communication unit and a radio resource allocation unit. The radio communication unit is configured to form an own cell and perform radio communication with a mobile station. The radio resource allocation unit temporarily allocates a radio resource of at least one of an uplink and a downlink to a mobile station belonging to a neighbor cell neighboring the own cell in response to a request from the mobile station belonging to the neighbor cell.

A third aspect of the present invention includes a radio communication system. The radio communication system includes first and second base stations, and a mobile station capable of performing radio communication with the first and second base stations. The mobile station is configured to, when the mobile station performs transmission of an uplink signal and reception of a downlink signal with the first base station, request the second base station to temporarily allocate a radio resource of at least one of an uplink and a downlink and use the radio resource allocated by the second base station for transmission of the uplink signal or reception of the downlink signal with the first base station.

A fourth aspect of the present invention includes a control method for a mobile station. The control method includes:
(a) requesting, when the mobile station belongs to a first cell and performs transmission of an uplink signal and reception of a downlink signal with a first base station that forms the first cell, a second base station forming a second cell neighboring the first cell to temporarily allocate a radio resource of at least one of an uplink and a downlink; and
(b) using the radio resource allocated by the second base station for transmission of the uplink signal or reception of the downlink signal with the first base station.

A fifth aspect of the present invention includes a control method for a base station capable of forming an own cell and performing radio communication with a mobile station. The control method includes temporarily allocating a radio resource of at least one of an uplink and a downlink to a mobile station belonging to a neighbor cell neighboring the own cell in response to a request from the mobile station belonging to the neighbor cell.

A sixth aspect of the present invention includes a program that causes a computer to perform control relating to a mobile station. The mobile station includes a radio communication unit capable of performing radio communication with first and second base stations. The control, performed by the computer executing the program, includes;
(a) requesting, when the mobile station belongs to a first cell and performs transmission of an uplink signal and reception of a downlink signal with a first base station that forms the first cell, a second base station forming a second cell neighboring the first cell to temporarily allocate a radio resource of at least one of an uplink and a downlink; and
(b) making the radio resource allocated by the second base station available for transmission of the uplink signal or reception of the downlink signal with the first base station performed by the radio communication unit.

A seventh aspect of the present invention includes a program that causes a computer to perform control for a base station capable of forming an own cell and performing radio communication with a mobile station. The control, performed by the computer executing the program, includes temporarily allocating a radio resource of at least one of an uplink and a downlink to a mobile station belonging to a neighbor cell neighboring the own cell in response to a request from the mobile station belonging to the neighbor cell.

Advantageous Effects of Invention

According to the above-described aspects of the present invention, it is possible to provide a mobile station apparatus, a base station apparatus, a radio communication system, a control method, and a program, capable of contributing to dynamic suppression of interference between neighboring cells that is caused by the collision of radio resources without relying on signaling performed between neighboring base stations.

DESCRIPTION OF EMBODIMENTS

Specific exemplary embodiments to which the present invention is applied are explained hereinafter in detail with reference to the drawings. The same components are denoted by the same symbols throughout the drawings, and duplicated explanation is omitted as appropriate for simplifying the explanation.

First Exemplary Embodiment

Figure 1:
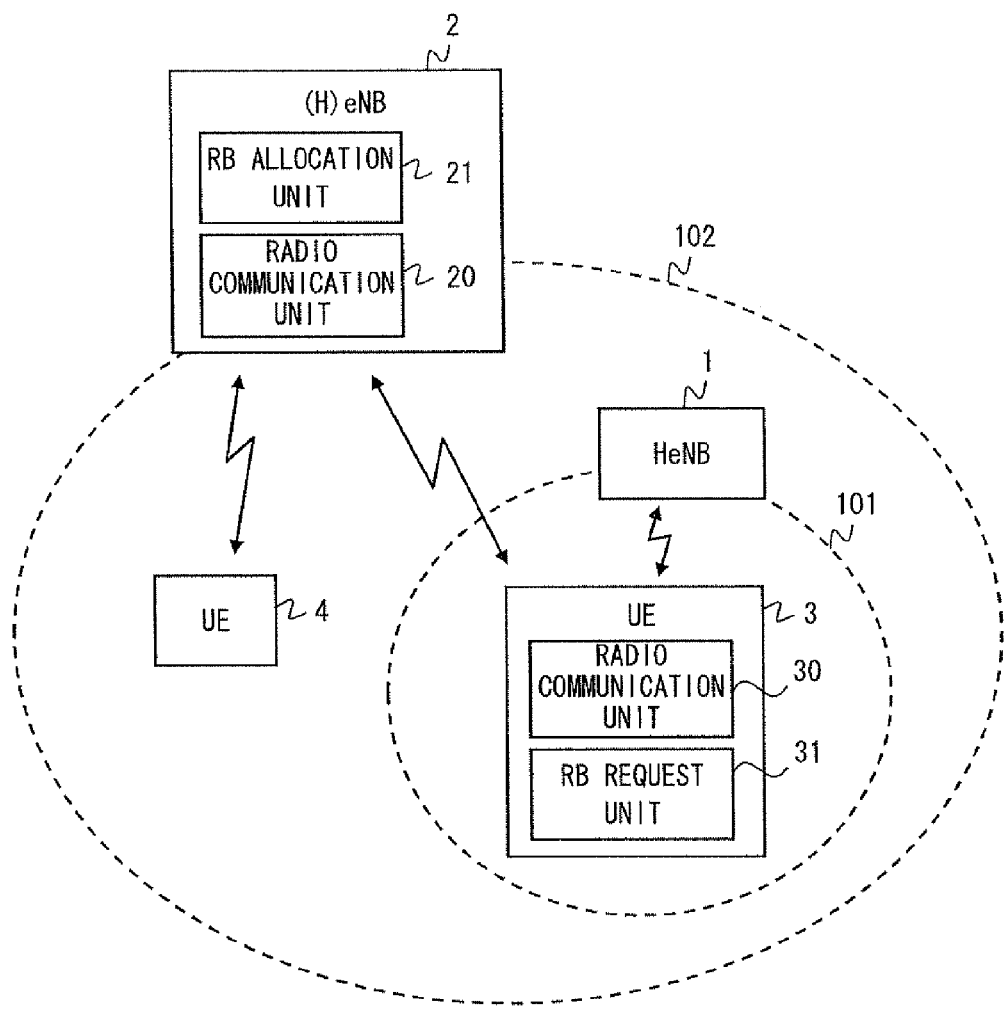
FIG. 1 is a block diagram showing a configuration example of a radio communication system according to a first exemplary embodiment of the present invention.

FIG. 1 is a block diagram showing a configuration example of a radio communication system according to this exemplary embodiment. This exemplary embodiment is explained by using an LTE system as an example. In FIG. 1, an HeNB 1 is a femtocell base station, and forms a femtocell 101 and thereby performs radio communication with an UE. A (H)eNB 2 forms a cell 102 neighboring the femtocell 101 and thereby performs radio communication with an UE. The (H)eNB 2 may be a femtocell base station or a macrocell base station. In the following explanation, an example in which the (H)eNB 2 is a macrocell base station is explained. Further, the (H)eNB 2 is simply referred to as "eNB 2". In FIG. 1, a UE 3 belongs to the cell 101 and a UE 4 belongs to the cell 102. Although only one UE 3 and one UE 4 are illustrated in FIG. 1 for simplifying the explanation, the number of each of the UE 3 and UE 4 may be more than one.

As stated above in "Background Art" section, when there is no inter-base-station interface between the HeNB 1 and the eNB 2, it is impossible to dynamically suppress the interference caused by the overlap of used RBs by performing inter-base-station signaling. In this exemplary embodiment, the dynamic interference suppression can be made possible by signaling performed between the UE 3 belonging to the cell 101 and the eNB 2 forming the neighbor cell 102. In the following explanation, specific examples of configurations and operations of the UE 3 and the eNB 2 to avoid interference are explained.

Firstly, a configuration example of the UE 3 shown in FIG. 1 is explained. A radio communication unit 30 is configured to perform bidirectional radio communication with the HeNB 1 and the eNB 2. Specifically, the radio communication unit 30 generates a transmission symbol sequence for each physical channel by performing error correction encoding for uplink transmission data, rate matching, interleaving, scrambling, and modulation symbol mapping. Further, the radio communication unit 30 generates an uplink signal by performing various processing such as mapping of the transmission symbol sequence to resource elements, DFTS-OFDM signal generation, frequency up-conversion, and signal amplification. The generated uplink signal is radio-transmitted from an antenna. Further, the radio communication unit 30 receives a downlink signal and performs restoration of a reception symbol sequence, restoration of reception data for each physical channel, and the like.

An RB request unit 31 requests the eNB 2, which forms the neighbor cell 102, to allocate RB(s) in order to suppress interference of RB(s) used for communication between the UE 3 and the HeNB 1. The requested RB(s) may be both of the downlink RB and the uplink RB, or may be only one of them. This request is radio-transmitted to the eNB 2 through the radio communication unit 30. Further, the RB request unit 31 receives information about an RB(s) that can be allocated and its allocation period, notified from the eNB 2 through the radio communication unit 30. Note that when the allocation period is defined in a fixed manner, the RB request unit 31 does not necessarily have to receive the information of the allocation period. The RB request unit 31 applies the RB allocated from the eNB 2 to the radio communication unit 30, and thereby makes the communication between the UE 3 and the HeNB 1 using the RB possible. Note that the RB request unit 31 may notify the HeNB 1 of the RB allocated from the eNB 2, or may not notify the eNB 1 of it. Even if the eNB 1 is not notified of the allocated RB, the eNB 1 can detect the available state of the RB and thereby perform communication using the RB.

Next, a configuration example of the eNB 2 shown in FIG. 1 is explained. A radio communication unit 20 performs radio communication with the UE 4 belonging to the own cell 102 and the UE 3 belonging to the neighbor cell 101. Specifically, the radio communication unit 20 generates a transmission symbol sequence for each physical channel by performing error correction encoding for downlink transmission data, rate matching, interleaving, scrambling, and modulation symbol mapping. Further, the radio communication unit 20 generates a downlink signal by performing various processing such as layer mapping for the transmission symbol sequence (when MIMO (Multiple Input/Multiple Output) is implemented), pre-coding (when MIMO is implemented), mapping to resource elements, OFDM signal generation, frequency up-conversion, and signal amplification. The generated downlink signal is radio-transmitted from an antenna. Further, the radio communication unit 20 receives an uplink signal and performs restoration of a reception symbol sequence, restoration of reception data for each physical channel, and the like.

An RB allocation unit 21 receives an RB allocation request transmitted from the UE 3, through the radio communication unit 20. The RB allocation unit 21 determines whether or not an RB(s) can be allocated to the UE 3. When the allocation is possible, the RB allocation unit 21 generates information about an RB(s) that can be allocated and its allocation period and transmits the generated information to the UE 3 through the radio communication unit 20. Note that when the allocation period is defined in a fixed manner, the RB allocation unit 21 does not necessarily have to generate the information of the allocation period.

In order to avoid the simultaneous use of the same RB which is already allocated to the UE 3 in the neighbor cell 101, the RB allocation unit 21 may prevent the use of the RB by the UE 4 belonging to the own cell 102. In other example, the RB allocation unit 21 does not allocate the RB to the UE 4 located near the neighbor cell 201, and allocates the RB to the UE 4 located near the eNB 2. The RB allocation control like this may be performed based on, for example, the reception power of a reference signal included in each uplink signal.

That is, the eNB 2 secures an RB(s) that is used by the UE 3 belonging to the neighbor cell 101 to perform communication with the neighbor eNB (HeNB 1). The eNB 2 prevents the UE 4 from using the RB allocated to the UE 3, so that the necessary throughput can be achieved in the communication between the eNB 1 and the UE 3.

Figure 2:
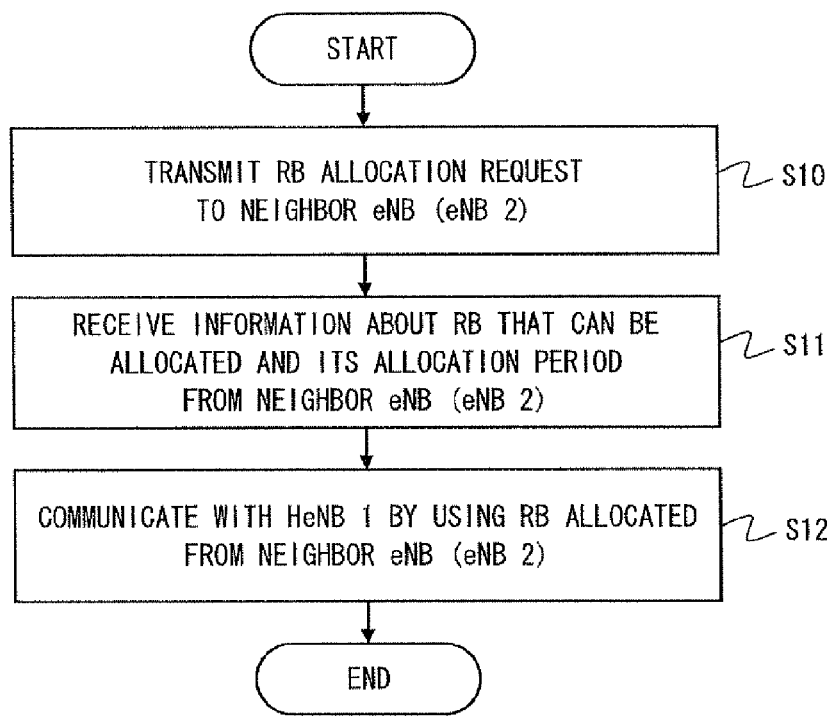
FIG. 2 is a flowchart showing a specific example of an RB request procedure for a neighbor cell (H)eNB performed by an UE shown in FIG. 1.

Next, an RB request procedure performed by the UE 3 and an RB allocation procedure performed by the eNB 2 are explained hereinafter in detail. FIG. 2 is a flowchart showing a specific example of an RB request procedure performed by the UE 3. In a step S10, the UE 3 transmits an RB allocation request to a neighbor eNB (i.e., eNB 2). In a step S11, the UE 3 receives information about an RB(s) that can be allocated and its allocation period from the eNB 2. In a step S12, the UE 3 communicates with the HeNB 1 by using the RB(s) allocated from the eNB 2. As described above, the RB(s) allocated from the eNB 2 may be both of the uplink RB and the downlink RB, or may be only one of them.

Figure 3:
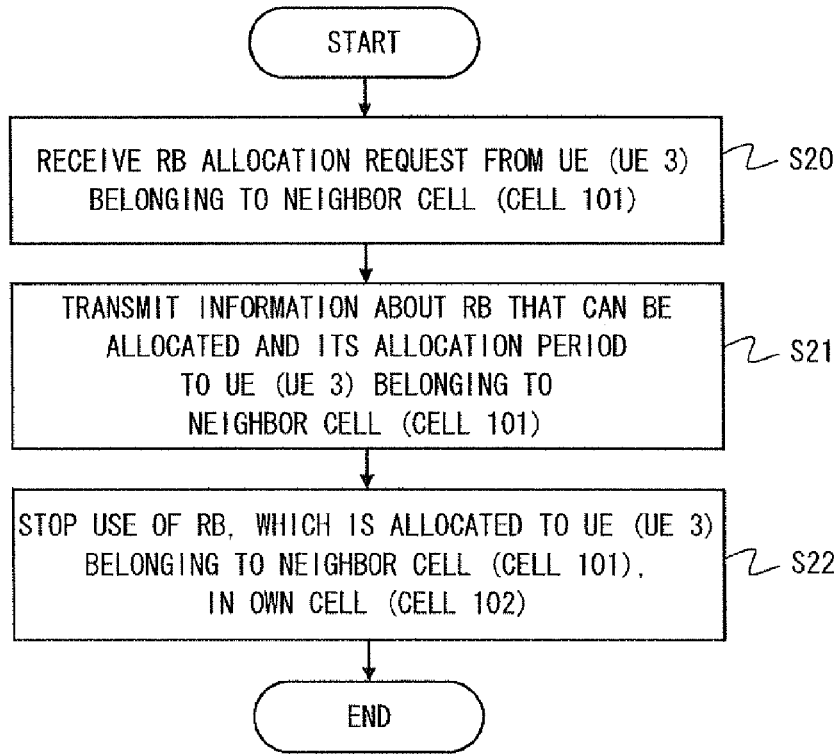
FIG. 3 is a flowchart showing a specific example of an RB allocation procedure for a neighbor cell UE performed by an (H)eNB shown in FIG. 1.

FIG. 3 is a flowchart showing a specific example of an RB allocation procedure performed by the eNB 2. In a step S20, the eNB 2 receives the RB allocation request from the UE 3 belonging to a neighbor cell (i.e., cell 101). In a step S21, the eNB 2 transmits information about an RB(s) that can be allocated and its allocation period to the UE 3. In a step S22, the eNB 2 prevents the use of the RB(s), allocated to the UE 3 belonging to the neighbor cell 101, in the own cell (i.e., cell 102) during the allocation period.

As described above, the radio communication system according to this exemplary embodiment can dynamic suppress the occurrence of interference caused by the overlap of RBs used in neighboring cells by the signaling performed between the UE 3 and the eNB 2 of the neighbor cell. Note that a number of variations are conceivable for the timing at which the UE 3 issues an RB allocation request to the eNB 2, and for the amounts of the requested RB(s). These variations are explained hereinafter in second and subsequent exemplary embodiments.

Second Exemplary Embodiment

In this exemplary embodiment, the UE 3 determines the transmission of the RB allocation request to the eNB 2 in response to decreasing when the throughput of the downlink or the uplink between the UE 3 and the HeNB 1 below a reference value. Further, the UE 3 requests the eNB 2 to allocate an RB(s) necessary for achieving the throughput corresponding to the reference value.

Further, when there are two or more neighbor eNBs (eNBs 2), the UE 3 may perform a neighbor cell search to determine the destination of the RB allocation request. For example, the UE 3 selects at least one (H)eNB for which the downlink reception power exceeds a threshold from among at least one neighbor (H)eNB that is detected by the neighbor cell search, and transmits an RB allocation request to the selected (H)eNB(s).

Figure 4:
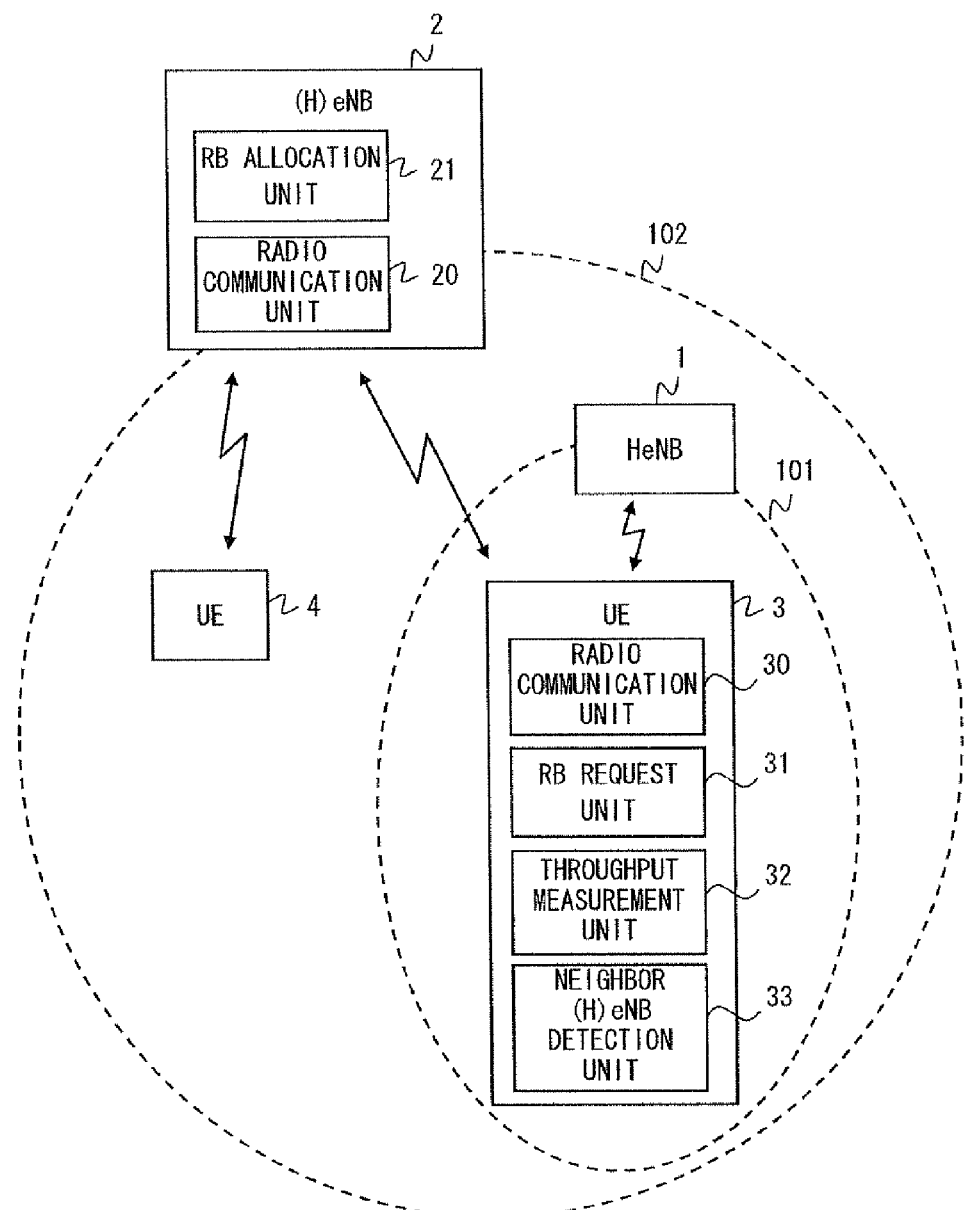
FIG. 4 is a block diagram showing a configuration example of a radio communication system according to a second exemplary embodiment of the present invention.

FIG. 4 shows a configuration example of a radio communication system according to this exemplary embodiment. FIG. 4 is different from FIG. 1 in that the UE 3 of FIG. 4 includes a throughput measurement unit 32 and a neighbor (H)eNB detection unit 33. The throughput measurement unit 32 measures communication throughput with the HeNB 1, and detects whether or not the throughput decreases below a reference value. The throughput measurement unit 32 may measure both the throughputs of the uplink and the downlink, or may measure only one of them. The reference value for the throughput is, for example, the minimum throughput necessary for the communication between the UE 3 and the HeNB 1.

The neighbor (H)eNB detection unit 33 performs a neighbor cell search and thereby detects at least one (H)eNB located in the vicinity.

The RB request unit 31 shown in FIG. 4 cooperates with the throughput measurement unit 32 and the neighbor (H)eNB detection unit 33, and thereby determines the transmission timing of an RB allocation request and the neighbor eNB 2 to which the RB allocation request is to be transmitted. That is, when it is detected that the throughput has decreased below the reference value, the RB request unit 31 selects at least one (H)eNB for which the downlink reception power is large from among at least one neighbor (H)eNB that has been detected by the neighbor cell search, and transmits an RB allocation request to the selected (H)eNB.

Figure 5:
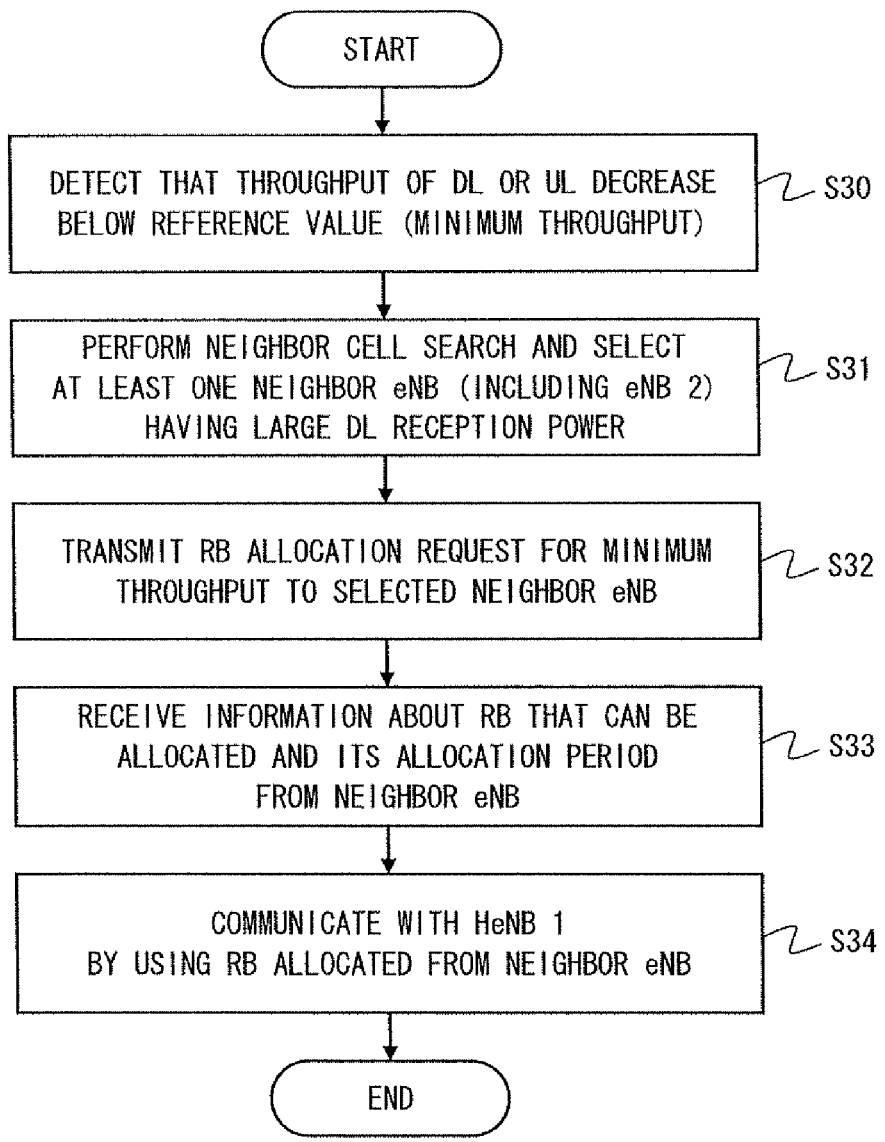
FIG. 5 is a flowchart showing a specific example of an RB request procedure for a neighbor cell (H)eNB performed by an UE shown in FIG. 4.

Next, a specific example of an RB request procedure performed by the UE 3 in this exemplary embodiment is explained. FIG. 5 is a flowchart showing the specific example. In a step S30, the UE 3 detects that the throughput of the downlink (DL) or the uplink (UL) has decreased below the reference value. In a step S31, the UE 3 performs a neighbor search and thereby selects at least one neighbor eNB (eNB 2) for which the downlink reception power is large. In a step S32, the UE 3 transmits an allocation request of an RB(s), necessary for performing minimum throughput communication, to the selected neighbor eNB. Steps S33 and S34 are similar to the steps S11 and S12 of FIG. 2. Note that when the UE 3 receives allocation of RBs from two or more neighbor eNBs 2, the UE 3 may use all of them or may use part of them that is necessary for the minimum throughput communication. When part of the RB is used, it is desirable to preferentially use the one that is allocated from a neighbor eNB for which the downlink reception power is relatively large. This is because that RB is expected to suppress the interference more effectively in comparison to the other RBs.

As described above, in this exemplary embodiment, when the throughput decreases below the reference value, the UE 3 requests allocation of an RB(s) necessary for achieving the throughput corresponding to the reference value. In this way, it is possible to prevent the UE 3 from requesting unnecessary RB from the eNB 2 and thereby prevent the decrease in the use efficiency of RBs in the eNB 2.

Further, when there are two or more neighbor eNBs 2 in the vicinity of the UE 3, the UE 3 selects a neighbor eNB 2 for which the downlink reception power is relatively large as the destination of the RB allocation request by using the result of a neighbor cell search. In this way, it is possible to efficiently request to the neighbor eNB 2 that is expected to produce a high interference suppression effect when the RB is allocated therefrom.

Further, in the following explanation, a specific example of a release procedure of an RB that the eNB 2 has allocated to the UE 3. Note that the "release of an RB" means to terminate the RB allocation to the UE 3 and make that RB available for the UE 4 belonging to the own cell (cell 102). The eNB 2 may release the RB when the allocation period has elapsed (upon time-out). Further, in combination with the RB release using the time-out, the eNB 2 may release the RB upon reception of an RB release request issued from the UE 3. For example, since the UE 3 can release the RB when the communication has finished without waiting for the time-out, the decrease of the use efficiency of RBs in the eNB 2 can be minimized. Further, there are cases where it is desired that the UE 3 can continuously use the RB beyond the allocation period. Therefore, the UE 3 may request the eNB 2 to re-allocate an RB.

Figure 6:
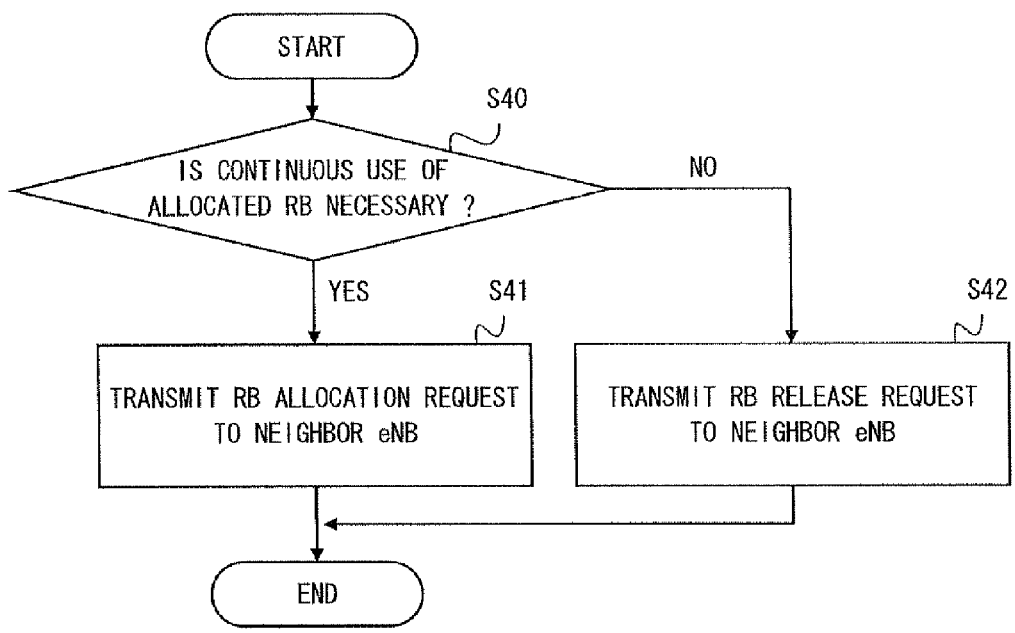
FIG. 6 is a flowchart showing a specific example of an RB re-allocation request procedure for a neighbor cell (H)eNB performed by an UE shown in FIG. 4.

FIG. 6 is a flowchart showing a specific example of the procedure in which the UE 3 requests the re-allocation of an RB. In a step S40, the UE 3 determines whether the continuous use of the RB allocated from the eNB 2 is necessary or not. When the continuous use is necessary (Yes at step S40), the UE 3 transmits an RB allocation request to the neighbor eNB (eNB 2) (step S41). This request may include the designation of an RB to be allocated or may not include the designation. On the other hand, when the continuous use of the RB is unnecessary, for example, for such a reason that the communication with the eNB 1 has already finished (No at step S40), the UE 3 transmits an RB release request to the neighbor eNB (eNB 2) (step S42).

Figure 7:
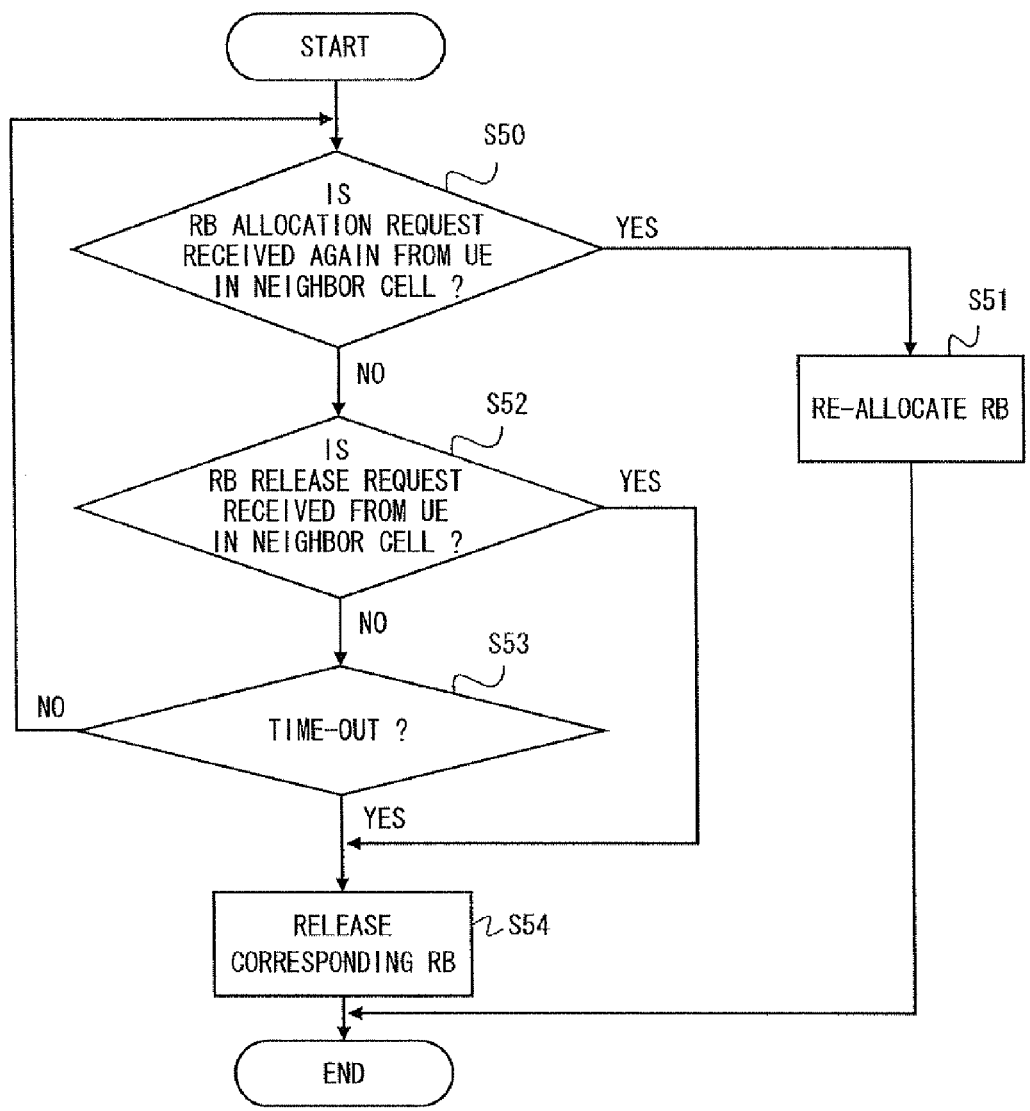
FIG. 7 is a flowchart showing a specific example of a release procedure for an allocated RB performed by (H)eNB shown in FIG. 4.

FIG. 7 is a flowchart showing a specific example of an RB release procedure in the eNB 2. In a step S50, the eNB 2 determines whether or not the eNB 2 has received an RB allocation request again from the UE (UE 3) in the neighbor cell (cell 101). When the eNB 2 has received the RB allocation request again (Yes at step S50), the eNB 2 allocates the RB to the UE 3 again (step S51). The RB to be allocated may be the same RB that was previously allocated, or may be a different RB from the previous one.

In a step S52, the eNB 2 determines whether or not the eNB 2 has received an RB release request from the UE 3. When the eNB 2 has received the RB release request (Yes at step S52), the eNB 2 releases the corresponding RB and makes that RB available for the UE 4 located within the own cell 102 (step S54).

In a step S53, the eNB 2 determines whether or not the allocation period, of which the UE 3 was notified when the RB was allocated, has elapsed (whether the time-out has occurred). When the time-out has occurred (Yes at step S53), the eNB 2 releases the corresponding RB and makes that RB available for the UE 4 located within the own cell 102 (step S54).

Figure 8:
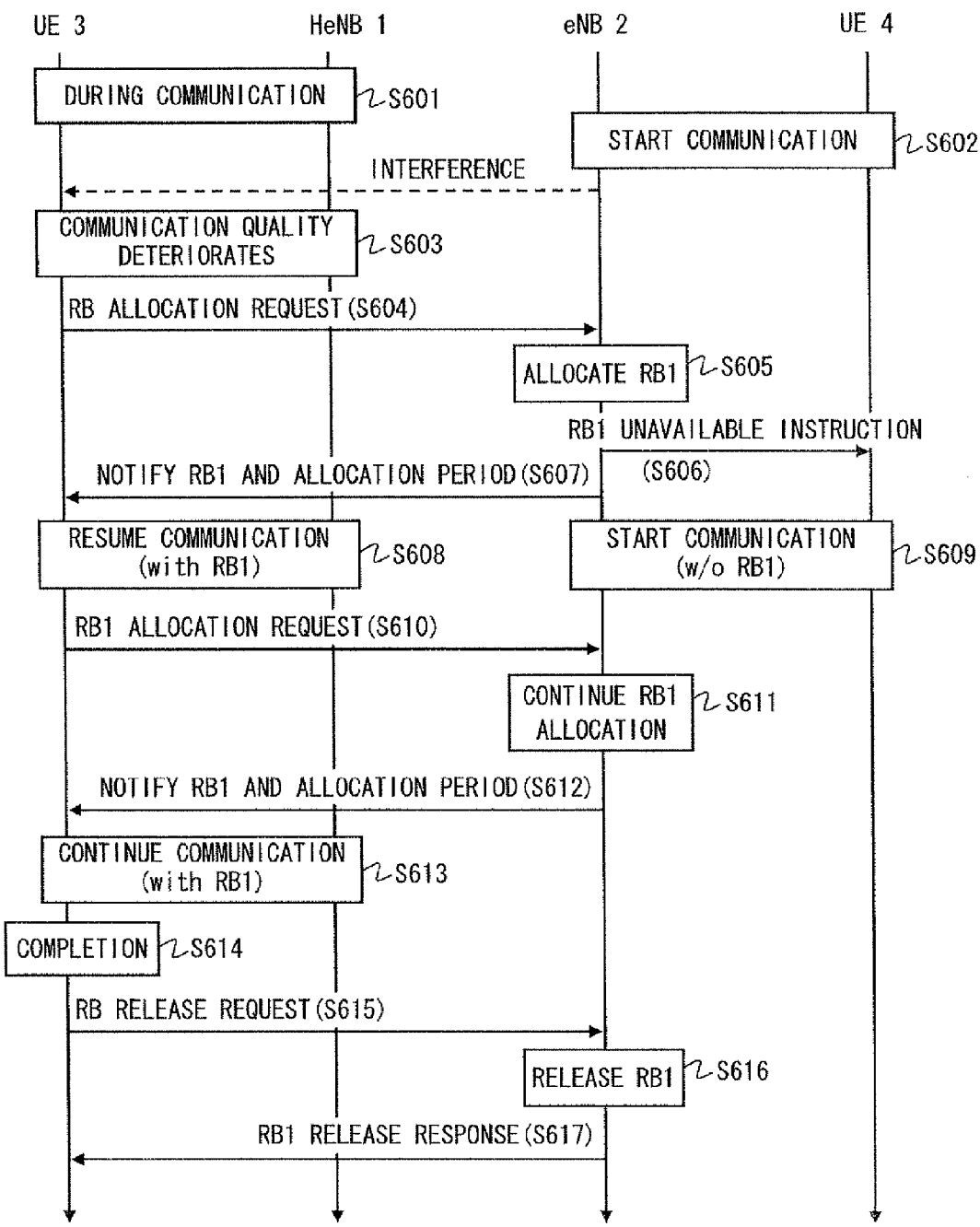
FIG. 8 is a sequence diagram showing a specific example of allocation and release processes for an RB in a radio communication system shown in FIG. 4.
Figure 9:
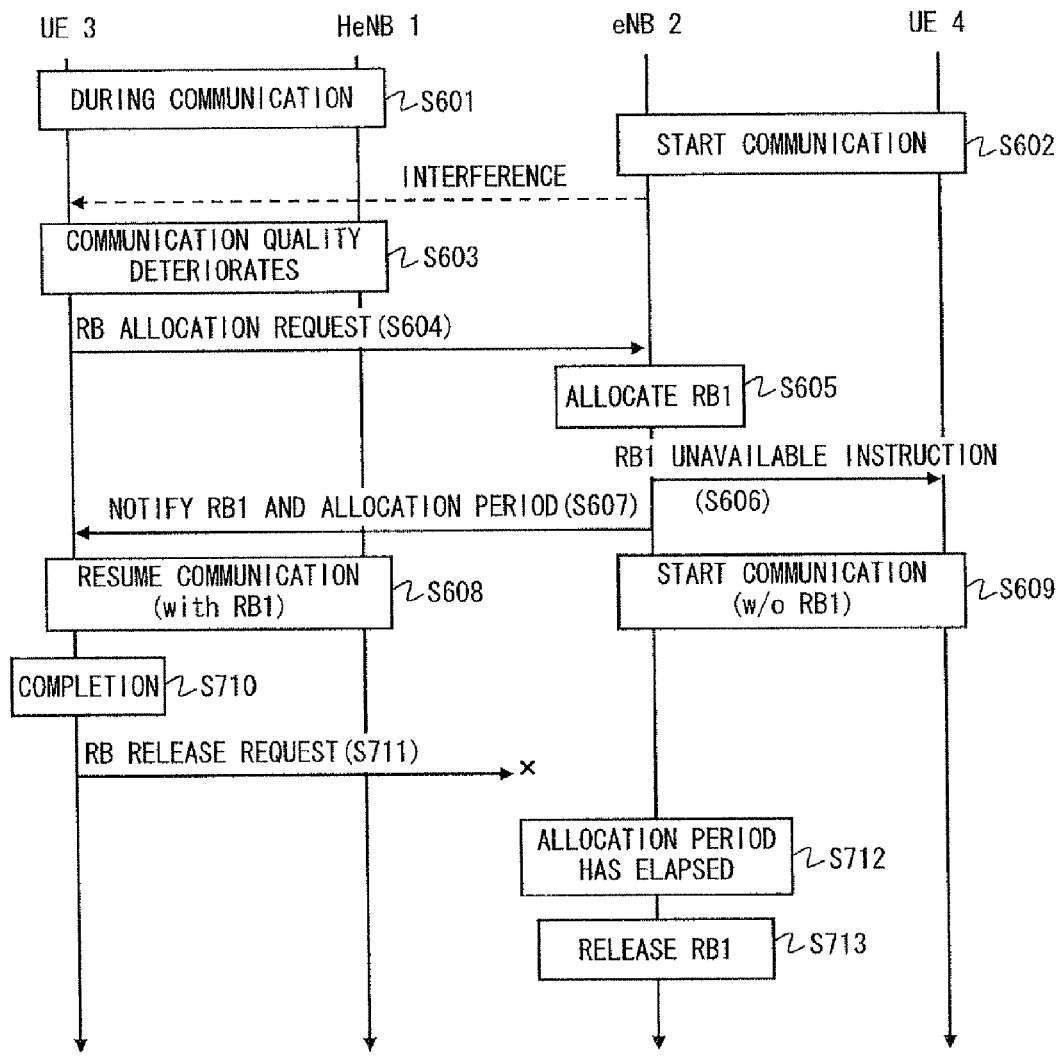
FIG. 9 is a sequence diagram showing another specific example of allocation and release processes for an RB in a radio communication system shown in FIG. 4.

FIGS. 8 and 9 show a specific example of a series of processing sequences from the allocation of an RB to the release of the RB. FIG. 8 shows an example in which an RB is released based on a release request from the UE 3. In a step S601, the UE 3 and the HeNB 1 perform communication by using a certain downlink RB and an uplink RB. In a step S602, the UE 4 and the eNB 2 start communication by using an RB that overlaps with the RB used by the UE 3 and the HeNB 1. As a result, interference occurs from the macrocell 102 to the femtocell 101. In a step S603, the UE 3 detects deterioration in the communication quality of the downlink signal or the uplink signal. For Example, the UE 3 detects the above-described decrease in the throughput.

In a step S604, the UE 3 transmits an RB allocation request to the eNB 2. In a step S605, the eNB 2 determines the RB to be allocated to the UE 3. Hereinafter, the RB to be allocated is referred to as "RB1". In a step S606, the eNB 2 notifies the UE 4 that the RB1 cannot be used. In a step S607, the eNB 2 transmits information about the RB1 and its allocation period to the UE 3. In a step S608, the UE 3 and the eNB 1 resume the communication by using the RB1. In a step S609, the UE 4 and the eNB 2 start communication by using an RB other than the RB1.

In a step S610, the UE 3 transmits a re-allocation request to the eNB 2 to continue the use of the RB1. In a step S611, the eNB 2 determines the continuation of the allocation of the RB1 to the UE 3. In a step S612, the eNB 2 transmits information about the RB1 and its allocation period to the UE 3. In a step S613, the UE 3 and the eNB 1 continue the communication by using the RB1.

When the communication between the UE 3 and the eNB 1 has been completed (step S614), the UE 3 transmits an RB release request to the eNB 2. In a step S616, the eNB 2 releases the RB1 in response to the release request. In a step S617, the eNB 2 transmits a response indicating that the RB 1 is released.

FIG. 9 shows an example in which an RB is released upon occurrence of a time-out. Steps S601 to S609 in FIG. 9 are similar to those of FIG. 8. In a step S710, the communication between the UE 3 and the eNB 1 has been completed. In a step S711, the UE 3 transmits an RB release request to the eNB 2. However, assume that this release request has disappeared without reaching the eNB 2 for some reason. In a step S712, the eNB 2 determines that the allocation period of the RB1 to the UE 3 has elapsed (time-out). In a step S713, the eNB 2 releases the RB1 upon occurrence of the time-out.

Third Exemplary Embodiment

In this exemplary embodiment, the UE 3 measures the level of the interference to the downlink communication between the UE 3 and the HeNB 1. Then, when the interference level exceeds a predetermined reference value, the UE 3 determines the transmission of an RB allocation request to the eNB 2. Further, the UE 3 requests the eNB 2 to allocate an RB(s) necessary for achieving the throughput corresponding to the reference value. In this process, the UE 3 may also request the allocation of an uplink RB(s).

Figure 10:
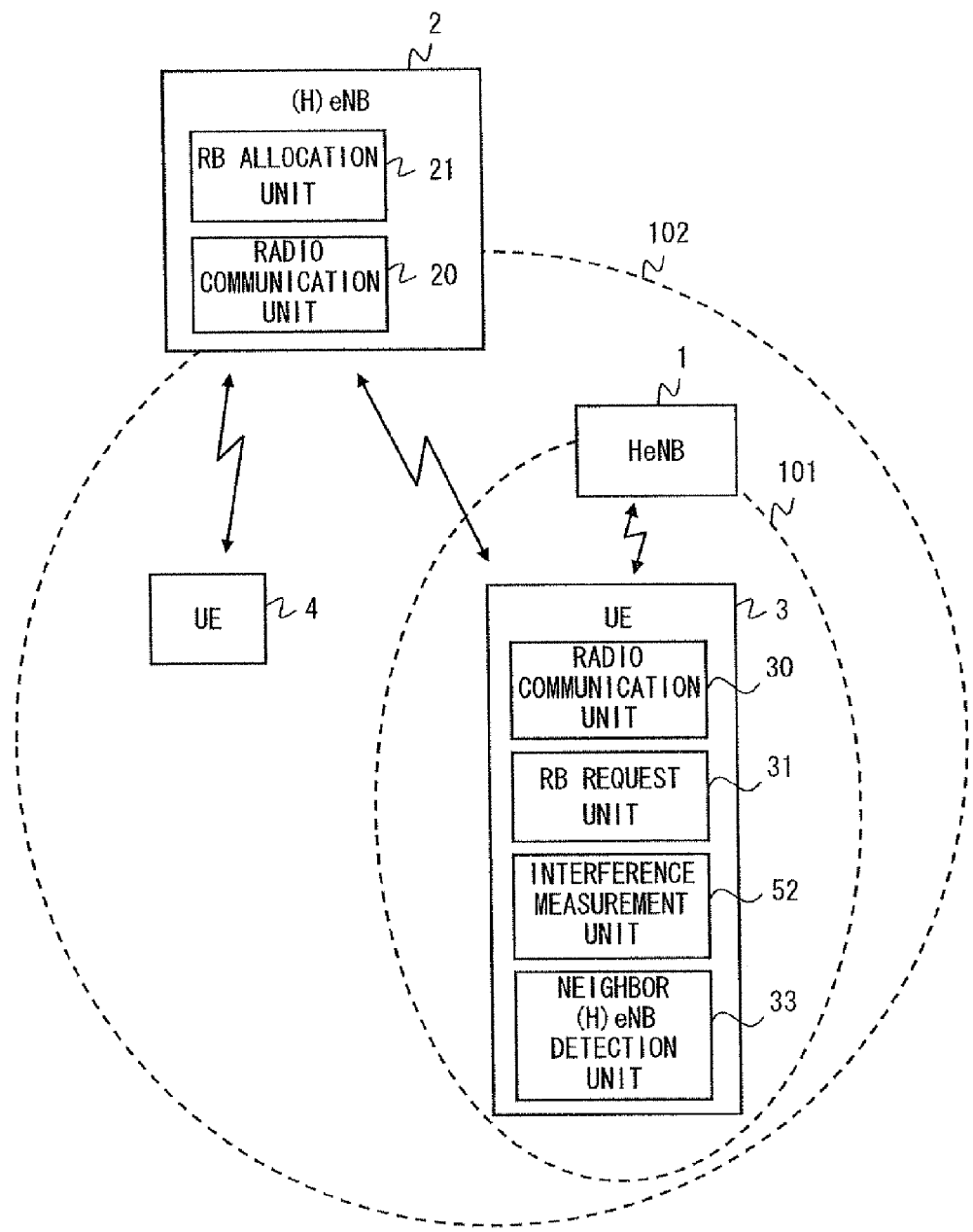
FIG. 10 is a block diagram showing a configuration example of a radio communication system according to a third exemplary embodiment of the present invention.

FIG. 10 shows a configuration example of a radio communication system according to this exemplary embodiment. FIG. 10 is different from FIG. 4 in that the UE 3 of FIG. 10 includes an interference measurement unit 52 instead of the throughput measurement unit 32. The interference measurement unit 52 measures the level of the interference to the downlink signal.

Fourth Exemplary Embodiment

In the above-described first to third exemplary embodiments, examples in an LTE system are explained. However, the application of the present invention is not limited to LTE systems. The above-described first to third exemplary embodiments are widely effective for the cases in which the inter-base-station interface capable of transmitting/receiving a control message between mutually-neighboring base stations (such as X2 interface) is not available. In this exemplary embodiment, an example in which the above-described second exemplary embodiment is applied to a WCDMA system is explained.

Figure 11:
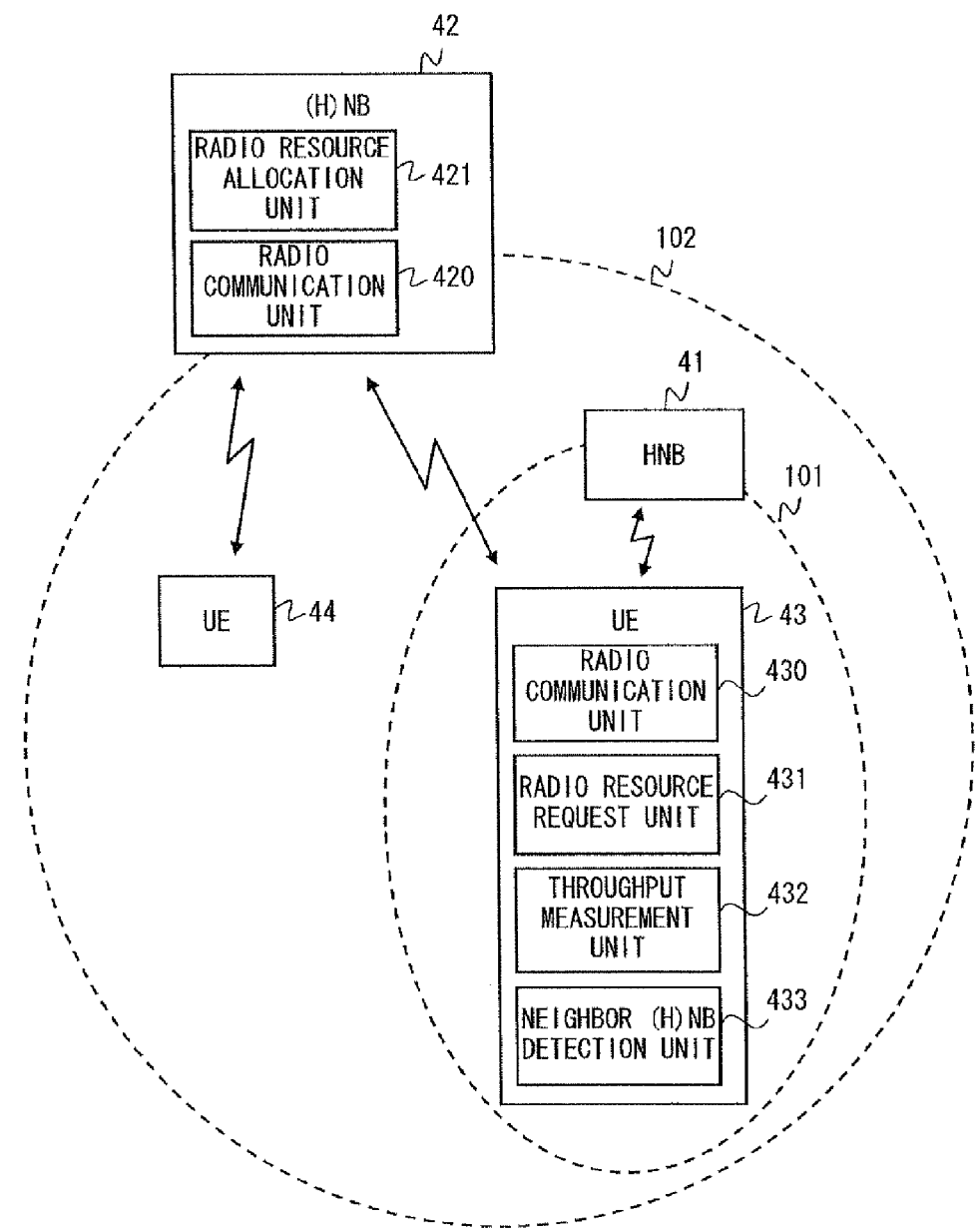
FIG. 11 is a block diagram showing a configuration example of a radio communication system according to a fourth exemplary embodiment of the present invention.

FIG. 11 shows a configuration example of a radio communication system according to this exemplary embodiment. An HNB 41 is a femtocell base station, and forms a femtocell 101 and thereby performs radio communication with an UE. A (H)NB 42 forms a cell 102 neighboring the femtocell 101 and thereby performs radio communication with the UE. The (H)NB 42 may be a femtocell base station or a macrocell base station. In the following explanation, an example in which the (H)NB 42 is a macrocell base station is explained. Further, the (H)NB 42 is simply referred to as "NB 42". In FIG. 11, a UE 43 belongs to the cell 101 and a UE 44 belongs to the cell 102. Although only one UE 43 and one UE 44 are illustrated in FIG. 11 for simplifying the explanation, the number of each of the UE 43 and UE 44 may be more than one.

This exemplary embodiment is similar to the above-described second exemplary embodiment. That is, the UE 43 determines the transmission of an RB allocation request to the NB 42 in response to decreasing the throughput of the downlink or the uplink between the UE 43 and the HNB 41 below a reference value. Further, the UE 43 requests the NB 42 to allocate a radio resource(s) necessary for achieving the throughput corresponding to the reference value. Note that radio resources in a WCDMA system are defined by radio frequencies, scrambling codes, and transmission power. Because of no orthogonality between scrambling codes, neighboring base stations, using the same downlink radio frequency and different scrambling codes, share radio resources by adjusting the transmission power.

As for the UE 43, a radio communication unit 430 shown in FIG. 11 corresponds to the radio communication unit 30 shown in FIG. 4. A radio resource request unit 431 corresponds to the RB request unit 31. A throughput measurement unit 432 corresponds to the throughput measurement unit 32. A neighbor (H)NB detection unit 433 corresponds to the neighbor (H)eNB detection unit 33. Further, as for the NB 42, a radio communication unit 420 shown in FIG. 11 corresponds to the radio communication unit 20 shown in FIG. 11. A radio resource allocation unit 421 corresponds to the RB allocation unit 21.

The throughput measurement unit 432 measures communication throughput with the HNB 41, and detects whether or not the throughput decreases below a reference value. The throughput measurement unit 432 may measure both the throughputs of the uplink and the downlink, or may measure only one of them. The reference value for the throughput is, for example, the minimum throughput necessary for the communication between the UE 43 and the HNB 41.

The neighbor (H)NB detection unit 433 performs a neighbor cell search and thereby detects at least one (H)NB located in the vicinity.

The radio resource request unit 431 cooperates with the throughput measurement unit 432 and the neighbor (H)NB detection unit 433 and thereby determines the transmission timing of a radio resource allocation request and the neighbor NB 42 to which the radio resource allocation request is to be transmitted. That is, when it is detected that the throughput of the uplink or the downlink has decreased below the reference value, the radio resource request unit 431 selects at least one (H)NB for which the downlink reception power is large from among at least one neighbor (H)NB that has been detected by the neighbor cell search, and transmits a radio resource allocation request to the selected (H)NB. The radio resource request unit 431 may request the allocation of an uplink radio resource in response to decreasing the uplink throughput below the reference value, and request the allocation of a downlink radio resource in response to decreasing the downlink throughput below the reference value.

The radio resource allocation unit 421 receives a radio resource allocation request transmitted from the UE 43, through the radio communication unit 420. The radio resource allocation unit 421 determines whether or not a radio resource(s) can be allocated to the UE 43. When the allocation is possible, the radio resource allocation unit 421 allocates a radio resource(s) for the communication between the UE 43 and the HNB 41. Specifically, in order to allocate a downlink radio resource for the communication between the UE 43 and the HNB 41, the radio resource allocation unit 421 may lower the downlink transmission power of the radio communication unit 420. The reduction of the downlink transmission power may be carried out by reducing the maximum downlink transmission power. Further, in order to allocate an uplink radio resource for the communication between the UE 43 and the HNB 41, the radio resource allocation unit 421 may lower the uplink total reception power (RTWP: Received Total Wideband Power) from UEs (including UE 44) belonging to the cell 102. Note that when a radio resource can be allocated, the radio resource allocation unit 421 may notify the UE 43 of an allocation period T during which the allocation is possible.

Since the NB 42 lowers the downlink transmission power or the uplink transmission power in the cell 102, the interference to the downlink signal or the uplink signal of the UE 43 decreases. In this way, the UE 43 communicates with the HNB 41. The UE 43 receives information about the allocation period T during which the allocation is possible from the NB 42, and communicates with the HNB 41 within this period. Note that the UE 43 may notify the HNB 41 of the allocation period T received from the NB 42, or may not notify the HNB 41 of the allocation period T. Even if the HNB 41 is not notified of the information of the allocation period T, the HNB 41 can detect the decrease in the interference and thereby can perform communication by using the radio resource.

Figure 12:
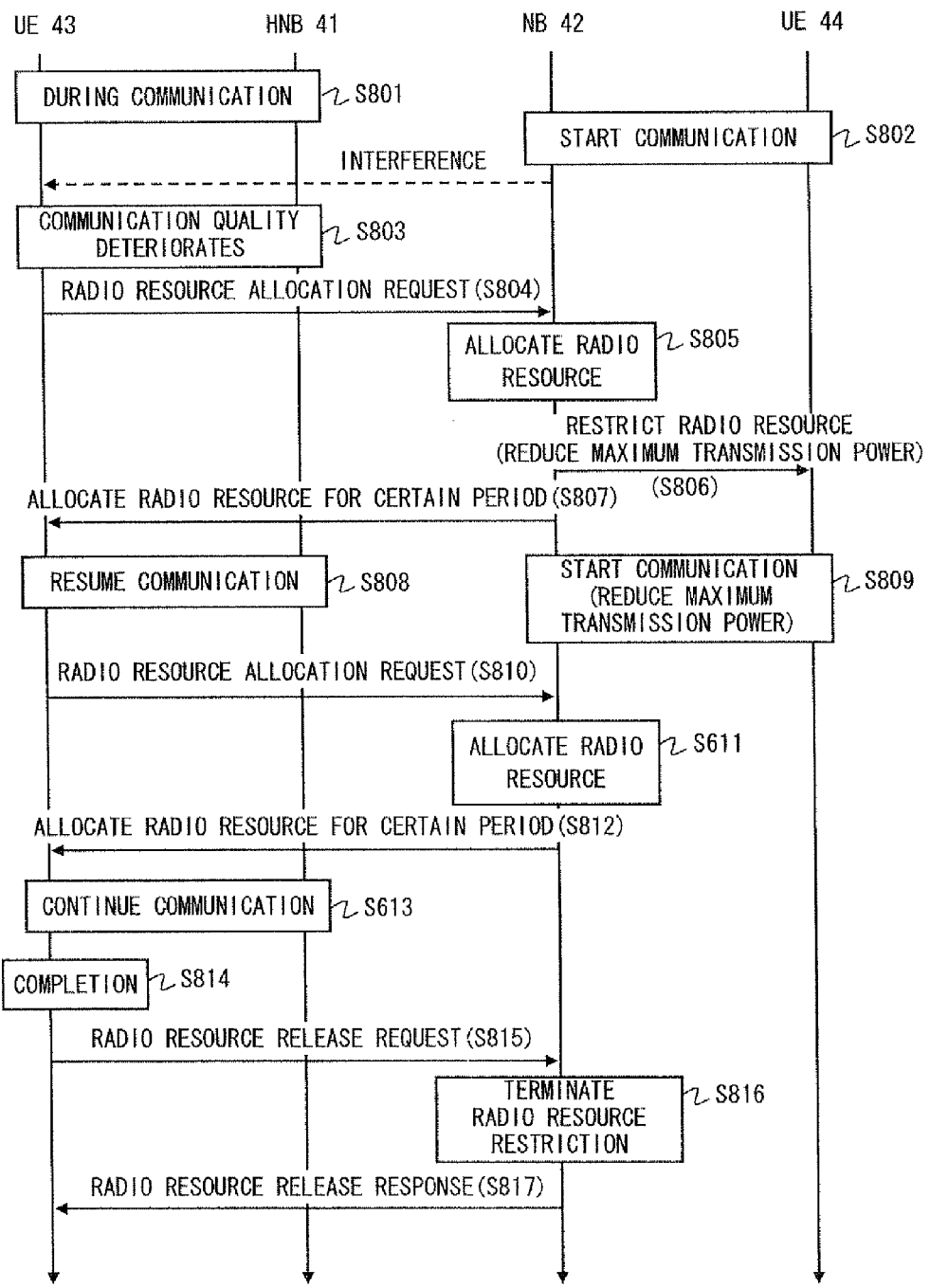
FIG. 12 is a sequence diagram showing a specific example of allocation and release processes for a radio resource in a radio communication system shown in FIG. 11.

FIG. 12 shows a specific example of a series of processing sequences from the allocation of a radio resource (i.e., reduction of transmission power) to the release of the radio resource (i.e., cancellation of the reduction of transmission power). FIG. 12 shows an example in which the reduction of transmission power performed by the NB 42 is cancelled based on a request from the UE 43. In a step S801, the UE 43 communicates with the HNB 41. In a step S802, the UE 44 and the NB 42 start communication by using the same radio resource as that used by the UE 43 and the HNB 41. As a result, interference occurs from the macrocell 102 to the femtocell 101. In a step S803, the UE 43 detects deterioration in the communication quality of the downlink signal or the uplink signal. For Example, the UE 43 detects the above-described decrease in the throughput.

In a step S804, the UE 43 transmits a radio resource allocation request to the NB 42. In a step S805, the NB 42 determines whether or not a radio resource can be allocated to the UE 43, i.e., whether or not the transmission power of the uplink or the downlink can be lowered. When a radio resource is to be allocated to the UE 43, the NB 42 notifies the UE 44 of the reduction of the transmission power in a step S806. In a step S807, the NB 42 notifies the UE 43 that the radio resource is allocated only for a certain period (allocation period T). Note that the allocation period does not necessarily have to be notified. In a step S808, the UE 43 and the HNB 41 resume the communication. In a step S809, the UE 44 and the NB 42 start the communication with the reduced transmission power.

In a step S810, the UE 43 transmits a re-allocation request to the NB 42 to continue the use of the radio resource beyond the allocation period T. In a step S811, the NB 42 determines the continuation of the radio resource allocation to the UE 43. In a step S812, the NB 42 notifies the UE 43 that the radio resource is allocated only for a certain period (allocation period T). In a step S808, the UE 43 and the HNB 41 continue the communication.

When the communication between the UE 43 and the HNB 41 has been completed (step S814), the UE 43 transmits a radio resource release request to the NB 42. In a step S816, the NB 42 cancels the restriction on the radio resource (i.e., reduction of transmission power) in response to the release request. In a step S817, the NB 42 transmits a response indicating that the radio resource is released.

Note that there are cases where the radio resource release request transmitted from the UE 43 disappears without reaching the NB 42 for some reason. Therefore, when the allocation period T has elapsed without receiving the re-allocation request from the UE 43, the NB 42 may cancel the restriction on the radio resource (i.e., reduction of transmission power).

Fifth Exemplary Embodiment

In this exemplary embodiment, an example in which the above-described third exemplary embodiment is applied to a WCDMA system is explained. That is, in this exemplary embodiment, the UE 43 measures the level of the interference to the downlink communication between the UE 43 and the HNB 41. Then, when the interference level exceeds a predetermined reference value, the UE 43 determines the transmission of a radio resource allocation request to the NB 42. Further, the UE 43 requests the NB 42 to allocate a radio resource(s) necessary for achieving the throughput corresponding to the reference value. In this process, the UE 43 may also request the allocation of an uplink radio resource(s).

Figure 13:
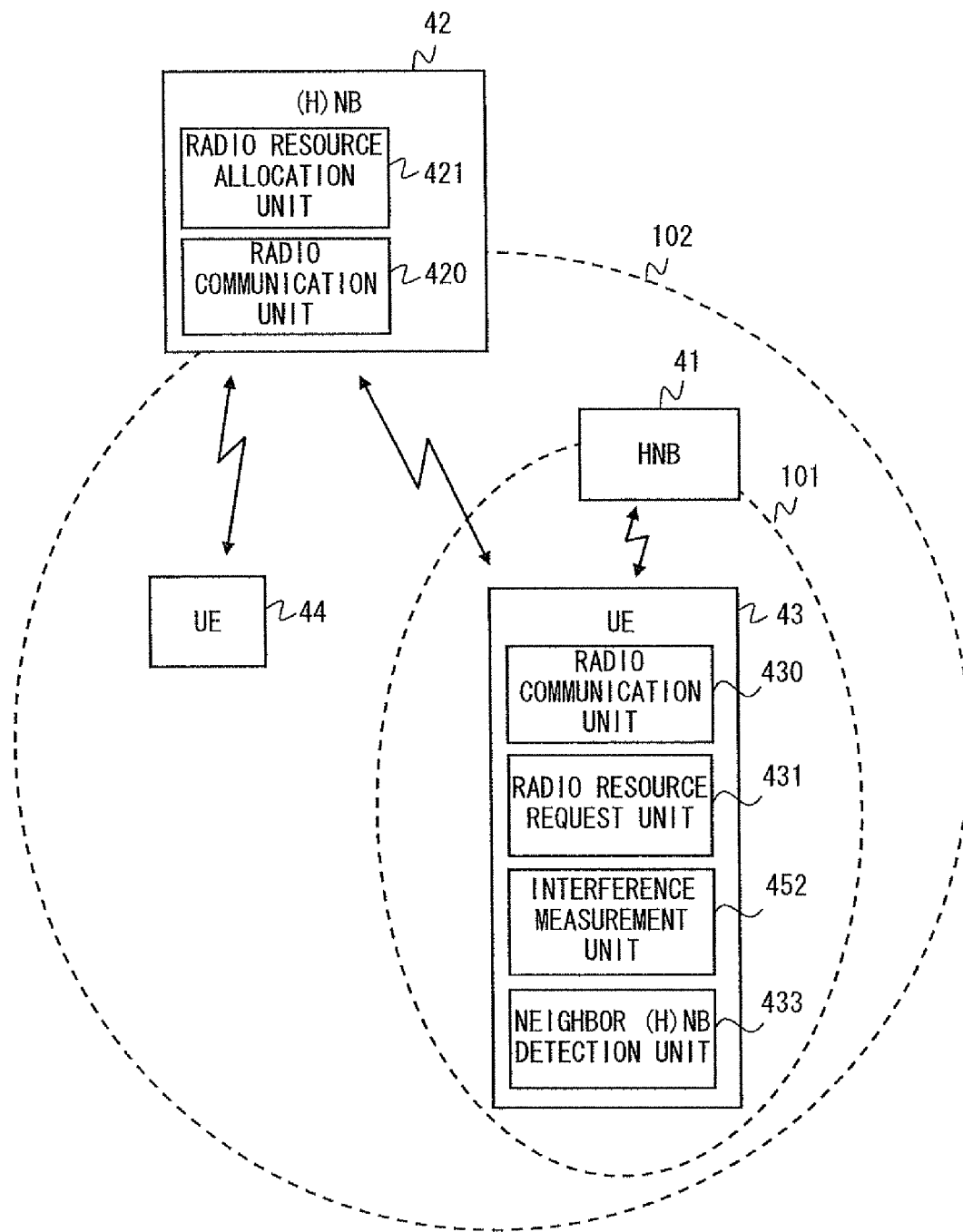
FIG. 13 is a block diagram showing a configuration example of a radio communication system according to a fifth exemplary embodiment of the present invention.

FIG. 13 shows a configuration example of a radio communication system according to this exemplary embodiment. FIG. 13 is different from FIG. 11 in that the UE 43 of FIG. 13 includes an interference measurement unit 452 instead of the throughput measurement unit 432. The interference measurement unit 452 measures the level of the interference to the downlink signal.

Other Exemplary Embodiments

The parameter indicating that interference is occurring in downlink and uplink communications between the UE 3 and the eNB 1 is not limited to the above-described "throughput" and "downlink interference level". In general, when interference is occurring, parameters relating to the communication quality change. Therefore, for example, the UE 3 measures an SIR (Signal to Interference Ratio), a BER (Bit Error Rate), and/or the like, and requests the eNB 2 to allocate an RB(s) in response to decreasing the measured value below a reference value.

Further, FIGS. 8 and 9 explained above show examples in which deterioration in the communication quality (e.g., decrease in throughput) that is caused when the UE 4 and the eNB 2 start communication after the UE 3 and the eNB 1 have already started communication is detected. In contrast to this, when the UE 3 and the eNB 1 start communication after the UE 4 and the eNB 2 have already started communication, the UE 3 may transmit an RB allocation request to the eNB 2 in response to detecting no available RB having sufficient communication quality. This is also true for FIG. 12.

Further, in each of the above-described exemplary embodiments, a case where the base station (HeNB1, HNB41), which manages a cell to which a mobile station (UE3, UE43) that requests a neighbor base station to allocate a radio resource including a resource block belongs, is a femtocell base station is explained. However, the base station that manages a cell to which a mobile station (UE3, UE43) belongs may be a macrocell base station. When the inter-base-station interface capable of transmitting/receiving a control message between mutually-neighboring base stations (such as X2 interface) is not available, a UE requests a radio resource to a neighbor base station. As a result, it is possible to dynamically suppress interference between the neighboring cells that is caused by the collision of radio resources without relying on signaling performed between the neighboring base stations.

Further, in each of the above-described exemplary embodiments, an example in an LTE system or a WCDMA system is explained. However, each exemplary embodiment can be also applied to other radio communication systems such as WiMAX and a wireless LAN (Local Access Network).

The radio resource (including RB) allocation request process performed by the UE 3 and the UE 43 described in the above-described each of the exemplary embodiments may be implemented by using an ASIC (Application Specific Integrated Circuit), a DSP (Digital Signal Processor), an MPU (Micro Processing Unit), a CPU (Central Processing Unit), or a computer system including a combination thereof. Similarly, the radio resource (including RB) allocation request process performed by the eNB 2 and the NB 42 may be also implemented by using a computer system. Specifically, a program including instructions relating to the processing procedure of the above-described RB request unit 31, the radio resource request unit 431, the RB allocation unit 21, or the radio resource allocation unit 421 may be executed by a computer system.

This program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or radio communication path.

Further, the present invention is not limited to the above-described exemplary embodiments, and needless to say, various modifications can be made without departing from the spirit and scope of the present invention described above.

For example, the whole or part of the exemplary embodiments disclosed above can be described as, but not limited to, the following supplementary notes.

(Supplementary Note 1)

A mobile station apparatus including:

a radio communication unit capable of performing radio communication with first and second base stations; and a radio resource request unit, in which the radio resource request unit requests the second base station to temporarily allocate a radio resource of at least one of an uplink and a downlink when the radio communication unit performs transmission of an uplink signal and reception of a downlink signal with the first base station, and the radio resource request unit makes the radio resource allocated by the second base station available for transmission of the uplink signal or reception of the downlink signal with the first base station performed by the radio communication unit.

(Supplementary Note 2)

The mobile station apparatus described in Supplementary note 1, in which the radio resource request unit is configured to, when communication quality of at least one of the uplink signal and the downlink signal decreases below a reference value, request the second base station to allocate a radio resource necessary for achieving the reference value.

(Supplementary Note 3)

The mobile station apparatus described in Supplementary note 1 or 2, in which the radio resource request unit is configured to request the second base station to temporarily allocate the radio resource upon occurrence of interference from a neighbor cell to at least one of the uplink signal and the downlink signal.

(Supplementary Note 4)

The mobile station apparatus described in any one of Supplementary notes 1 to 3, in which the radio resource request unit is configured to request the second base station to temporarily allocate the radio resource upon detection of a decrease in throughput of at least one of the uplink signal and the downlink signal.

(Supplementary Note 5)

The mobile station apparatus described in any one of Supplementary notes 1 to 4, in which the second base station includes a plurality of base stations, and the radio resource request unit is configured to request at least one base station, selected from the plurality of base stations according to magnitude of downlink reception power, to allocate the radio resource.

(Supplementary Note 6)

A base station apparatus including:

a radio communication unit capable of forming an own cell and performing radio communication with a mobile station; and a radio resource allocation unit configured to temporarily allocate a radio resource of at least one of an uplink and a downlink to a mobile station belonging to a neighbor cell neighboring the own cell in response to a request from the mobile station belonging to the neighbor cell.

(Supplementary Note 7)

The base station apparatus described in Supplementary note 6, in which the radio resource allocation unit is configured to prohibit any other mobile station belonging to the own cell from using the radio resource allocated to the mobile station belonging to the neighbor cell.

(Supplementary Note 8)

A radio communication system including:

a first base station capable of forming a first cell;

a second base station capable of forming a second cell neighboring the first cell; and a mobile station capable of performing radio communication with the first and second base stations, in which the mobile station is configured to, when the mobile station performs transmission of an uplink signal and reception of a downlink signal with the first base station, request the second base station to temporarily allocate a radio resource of at least one of an uplink and a downlink and use the radio resource allocated by the second base station for transmission of the uplink signal or reception of the downlink signal with the first base station.

(Supplementary Note 9)

The radio communication system described in Supplementary note 1, in which the mobile station is configured to, when communication quality of at least one of the uplink signal and the downlink signal decreases below a reference value, request the second base station to allocate a radio resource necessary for achieving the reference value.

(Supplementary Note 10)

The radio communication system described in Supplementary note 8 or 9, in which the mobile station is configured to request the second base station to temporarily allocate the radio resource upon occurrence of interference from a neighbor cell to at least one of the uplink signal and the downlink signal.

(Supplementary Note 11)

The radio communication system described in any one of Supplementary notes 8 to 10, in which the mobile station is configured to request the second base station to temporarily allocate the radio resource when a decrease in throughput of at least one of the uplink signal and the downlink signal is detected.

(Supplementary Note 12)

The radio communication system described in any one of Supplementary notes 8 to 11, in which the second base station is configured to prohibit any other mobile station belonging to the second cell from using the radio resource allocated to the mobile station belonging to the first cell.

(Supplementary Note 13)

The radio communication system described in any one of Supplementary notes 8 to 12, in which the second base station includes a plurality of base stations, and the mobile station is configured to request at least one base station, selected from the plurality of base stations according to magnitude of downlink reception power, to allocate the radio resource.

(Supplementary Note 14)

A control method for a mobile station, the method including:

requesting, when the mobile station belongs to a first cell and performs transmission of an uplink signal and reception of a downlink signal with a first base station that forms the first cell, a second base station forming a second cell neighboring the first cell to temporarily allocate a radio resource of at least one of an uplink and a downlink; and using the radio resource allocated by the second base station for transmission of the uplink signal or reception of the downlink signal with the first base station.

(Supplementary Note 15)

The method described in Supplementary note 14, in which the request for temporary allocation of the radio resource includes requesting to allocate a radio resource necessary for achieving a reference value when communication quality of at least one of the uplink signal and the downlink signal decreases below the reference value.

(Supplementary Note 16)

The method described in Supplementary note 15 or 16, in which the request for temporary allocation of the radio resource is issued upon occurrence of interference from a neighbor cell to at least one of the uplink signal and the downlink signal.

(Supplementary Note 17)

The method described in any one of Supplementary notes 14 to 16, in which the request for temporary allocation of the radio resource is issued upon detection of a decrease in throughput of at least one of the uplink signal and the downlink signal.

(Supplementary Note 18)

The method described in any one of Supplementary notes 14 to 17, in which the second base station includes a plurality of base stations, and the request for temporary allocating of the radio resource is issued to at least one base station selected from the plurality of base stations according to magnitude of downlink reception power.

(Supplementary Note 19)

A control method for a base station capable of forming an own cell and performing radio communication with a mobile station, the method including:

temporarily allocating a radio resource of at least one of an uplink and a downlink to a mobile station belonging to a neighbor cell neighboring the own cell in response to a request from the mobile station belonging to the neighbor cell.

(Supplementary Note 20)

A computer program that causes a computer to perform control relating to a mobile station, in which the mobile station includes a radio communication unit capable of performing radio communication with first and second base stations, and the control includes:

requesting, when the mobile station belongs to a first cell and performs transmission of an uplink signal and reception of a downlink signal with a first base station that forms the first cell, a second base station forming a second cell neighboring the first cell to temporarily allocate a radio resource of at least one of an uplink and a downlink; and making the radio resource allocated by the second base station available for transmission of the uplink signal or reception of the downlink signal with the first base station performed by the radio communication unit.

(Supplementary Note 21)

A program that causes a computer to perform control for a base station capable of forming an own cell and performing radio communication with a mobile station, in which the control includes temporarily allocating a radio resource of at least one of an uplink and a downlink to a mobile station belonging to a neighbor cell neighboring the own cell in response to a request from the mobile station belonging to the neighbor cell.

(Supplementary Note 22)

The mobile station apparatus according to any one of Supplementary notes 1 to 7, in which the radio resource includes a resource block.

(Supplementary Note 23)

The mobile station apparatus according to any one of Supplementary notes 1 to 7, in which the radio resource includes transmission power.

(Supplementary Note 24)

A non-transitory computer readable medium storing a program described in Supplementary note 21.

This application is based upon and claims the benefit of priority from Japanese patent application No. 2010-013008, filed on Jan. 25, 2010 and Japanese patent application No. 2010-090122, filed on Apr. 9, 2010, the disclosure of which is incorporated herein in their entirety by reference.

REFERENCE SIGNS LIST

1 HeNB
2 (H)eNB
3 UE
4 UE
20 RADIO COMMUNICATION UNIT
21 RB ALLOCATION UNIT
30 RADIO COMMUNICATION UNIT
31 RB REQUEST UNIT
32 THROUGHPUT MEASUREMENT UNIT
33 NEIGHBOR (H)eNB DETECTION UNIT
52 INTERFERENCE MEASUREMENT UNIT
101 CELL
102 CELL
41 HNB
42 (H)NB
43 UE
44 UE
420 RADIO COMMUNICATION UNIT
421 RADIO RESOURCE ALLOCATION UNIT
430 RADIO COMMUNICATION UNIT
431 RADIO RESOURCE REQUEST UNIT
432 THROUGHPUT MEASUREMENT UNIT
433 NEIGHBOR (H)NB DETECTION UNIT
452 INTERFERENCE MEASUREMENT UNIT

The invention claimed is:

1. A mobile station apparatus comprising:
a radio communication unit configured to perform radio communication with first and second base stations; and
a radio resource request unit, wherein:
the radio resource request unit is configured to request the second base station to temporarily allocate a radio resource of at least one of an uplink and a downlink when the radio communication unit performs transmission of an uplink signal and reception of a downlink signal with the first base station, and
the radio resource request unit is configured to make the radio resource allocated by the second base station available for transmission of the uplink signal or reception of the downlink signal with the first base station performed by the radio communication unit.

2. The mobile station apparatus according to claim 1, wherein the radio resource request unit is configured to, when communication quality of at least one of the uplink signal and the downlink signal decreases below a reference value, request the second base station to allocate a radio resource necessary for achieving the reference value.

3. The mobile station apparatus according to claim 1, wherein the radio resource request unit is configured to request the second base station to temporarily allocate the radio resource upon occurrence of interference from a neighbor cell to at least one of the uplink signal and the downlink signal.

4. The mobile station apparatus according to claim 1, wherein the radio resource request unit is configured to request the second base station to temporarily allocate the radio resource upon detection of a decrease in throughput of at least one of the uplink signal and the downlink signal.

5. The mobile station apparatus according to claim 1, wherein:
the second base station includes a plurality of base stations, and
the radio resource request unit is configured to request at least one base station, selected from the plurality of base stations according to magnitude of downlink reception power, to allocate the radio resource.

6. The mobile station apparatus according to claim 1, wherein the radio resource includes a resource block.

7. The mobile station apparatus according to claim 1, wherein the radio resource includes transmission power.

8. The mobile station apparatus according to claim 1, wherein the radio resource request unit wirelessly transmits directly to the second base station a request to temporarily allocate a radio resource.

9. A base station apparatus comprising:
a radio communication unit configured to form an own cell and perform radio communication with a mobile station; and
a radio resource allocation unit configured to temporarily allocate a radio resource of at least one of an uplink and a downlink to a mobile station belonging to a neighbor cell neighboring the own cell in response to a request from the mobile station belonging to the neighbor cell.

10. The base station apparatus according to claim 9, wherein the
radio resource allocation unit is configured to prohibit any other mobile station belonging to the own cell from using the radio resource allocated to the mobile station belonging to the neighbor cell.

11. The base station apparatus according to claim 9, wherein the request from the mobile station belonging to the neighbor cell is wirelessly transmitted from the mobile station directly to the base station apparatus.

12. A control method for a mobile station, the method comprising:
requesting, when the mobile station belongs to a first cell and performs transmission of an uplink signal and reception of a downlink signal with a first base station that forms the first cell, a second base station forming a second cell neighboring the first cell to temporarily allocate a radio resource of at least one of an uplink and a downlink; and
using the radio resource allocated by the second base station for transmission of the uplink signal or reception of the downlink signal with the first base station.

13. The method according to claim 12, wherein the request for temporary allocation of the radio resource includes requesting to allocate a radio resource necessary for achieving a reference value when communication quality of at least one of the uplink signal and the downlink signal decreases below the reference value.

14. The method according to claim 12, wherein the request for temporary allocation of the radio resource is issued upon occurrence of interference from a neighbor cell to at least one of the uplink signal and the downlink signal.

15. The method according to claim 12, wherein the request for temporary allocation of the radio resource is issued upon detection of a decrease in throughput of at least one of the uplink signal and the downlink signal.

16. The method according to claim 12, wherein the second base station includes a plurality of base stations, and the request for temporary allocating of the radio resource is issued to at least one base station selected from the plurality of base stations according to magnitude of downlink reception power.

17. The method according to claim 12, wherein said requesting includes wirelessly transmitting, from the mobile station directly to the second base station, a request to temporarily allocate a radio resource.

\* \* \* \* \*